United States Patent
Tiirola et al.

(10) Patent No.: US 9,232,500 B2
(45) Date of Patent: Jan. 5, 2016

(54) METHOD AND APPARATUS FOR INTERFERENCE-RESISTANT WIRELESS COMMUNICATIONS

(75) Inventors: Esa Tapani Tiirola, Kempele (FI); Kari Pekka Pajukoski, Oulu (FI); Cassio Ribeiro, Espoo (FI); Olav Tirkkonen, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 202 days.

(21) Appl. No.: 13/505,604

(22) PCT Filed: Nov. 3, 2009

(86) PCT No.: PCT/EP2009/064501
§ 371 (c)(1),
(2), (4) Date: Jul. 20, 2012

(87) PCT Pub. No.: WO2011/054368
PCT Pub. Date: May 12, 2011

(65) Prior Publication Data
US 2012/0281670 A1 Nov. 8, 2012

(51) Int. Cl.
*H04W 72/04* (2009.01)
*H04W 56/00* (2009.01)

(52) U.S. Cl.
CPC .............. *H04W 72/04* (2013.01); *H04W 56/00* (2013.01); *H04W 72/042* (2013.01); *H04W 72/0413* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 7,079,506 B1 * | 7/2006 | Mottonen | H04W 16/02 370/329 |
| 2006/0133522 A1 | 6/2006 | Sutivong et al. | 375/260 |
| 2008/0076438 A1 | 3/2008 | Chang et al. | 455/452.2 |
| 2009/0213950 A1 * | 8/2009 | Gorokhov et al. | 375/260 |
| 2009/0252051 A1 | 10/2009 | Yu et al. | 370/252 |
| 2010/0075706 A1 * | 3/2010 | Montojo et al. | 455/513 |
| 2011/0034175 A1 * | 2/2011 | Fong et al. | 455/450 |
| 2011/0188481 A1 * | 8/2011 | Damnjanovic et al. | 370/336 |

FOREIGN PATENT DOCUMENTS

WO WO 2009/084760 A1 7/2009
WO WO 2009/119779 A2 10/2009

* cited by examiner

*Primary Examiner* — Ashley Shivers
(74) *Attorney, Agent, or Firm* — Harrington & Smith

(57) ABSTRACT

In accordance with an example embodiment of the present invention, an apparatus is disclosed that includes a resource module configured to allocate a first resource and a second resource that are at least partially synchronized in at least one of a time domain and a frequency domain in such a way that the first resource and the second resource share at least one of an overlapping frequency band and a same time slot. The apparatus also includes a transceiver configured to transmit a first signal on the first resource and receive a second signal on the second resource, wherein at least one of the first signal and the second signal is at least partially orthogonalized with respect to a third signal that is transmitted on one of the first resource and the second resource from a neighbor network device.

20 Claims, 4 Drawing Sheets

METHOD AND APPARATUS FOR INTERFERENCE-RESISTANT WIRELESS COMMUNICATIONS

TECHNICAL FIELD

The present application relates generally to a method and apparatus for interference-resistant wireless communications.

BACKGROUND

Some wireless systems such as the local area networks may utilize the license-exempt spectrum or white spaces made available as television is converted to digital broadcasting to take advantage of the additional available bandwidth. The local area network may offer an efficient device-to-device operation, particularly in establishing ad-hoc network operations. Often the deployments of local area wireless networks are uncoordinated and various wireless network devices may be put in use on a temporary or semi-temporary basis with little consideration of the resource allocation and interferences among network devices.

One recent trend is to use the same wireless technology for both cellular network and local area network to promote seamless integration and interworking. One example technology that is being considered for both cellular network and local area network is long-term evolution—advanced (LTE-A). As such, dynamic time division duplex (TDD) switching points, which demarcate uplink resources and downlink resources for a network device, may be used in local area network.

SUMMARY

Various aspects of examples of the invention are set out in the claims.

According to a first aspect of the present invention, an apparatus comprises a resource module configured to allocate a first resource and a second resource that are at least partially synchronized in at least one of a time domain and a frequency domain in such a way that the first resource and the second resource share at least one of an overlapping frequency band and a same time slot. The apparatus also comprises a transceiver configured to transmit a first signal on the first resource and receive a second signal on the second resource, wherein at least one of the first signal and the second signal is at least partially orthogonalized with respect to a third signal that is transmitted on one of the first resource and the second resource from a neighbor network device.

According to a second aspect of the present invention, a method comprises allocating a first resource and a second resource that are at least partially synchronized in at least one of a time domain and a frequency domain in such a way that the first resource and the second resource share at least one of an overlapping frequency band and a same time slot. The method also comprises transmitting a first signal on the first resource and receiving a second signal on the second resource, wherein at least one of the first signal and the second signal is at least partially orthogonalized with respect to a third signal that is transmitted on one of the first resource and the second resource from a neighbor network device.

According to a third aspect of the present invention, an apparatus comprises at least one processor and at least one memory including computer program code. The at least one memory and the computer program code configured to, with the at least one processor, cause the apparatus to perform at least the following: allocate a first resource and a second resource that are at least partially synchronized in at least one of a time domain and a frequency domain in such a way that the first resource and the second resource share at least one of an overlapping frequency band and a same time slot; transmit a first signal on the first resource, and receive a second signal on the second resource, wherein at least one of the first signal and the second signal is at least partially orthogonalized with respect to a third signal that is transmitted on one of the first resource and the second resource from a neighbor network device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

TDD systems which have flexible uplink-downlink switching point between neighboring network devices may have an interference issue due to uplink to downlink inteferences and downlink to uplink interferences. One step towards helping address the issue of interference among network devices and facilitating the deployment of local area wireless network is to synchronize the network. Mere synchronization may not be sufficient to solve the interference issue in the case where the uplink and downlink channels share the same frequency and time slots with neighboring cells. To reduce the interference coming from a third source in the local area network, the signals transmitted and received on the synchronized resources are made orthogonal to the signals from a third, neighbor network device. A synchronized resource may be shared with other network devices for designated signals such as reference signal or control signal.

An example embodiment of the present invention and its potential advantages are understood by referring to FIGS. 1 through 4 of the drawings.

Figure 1:
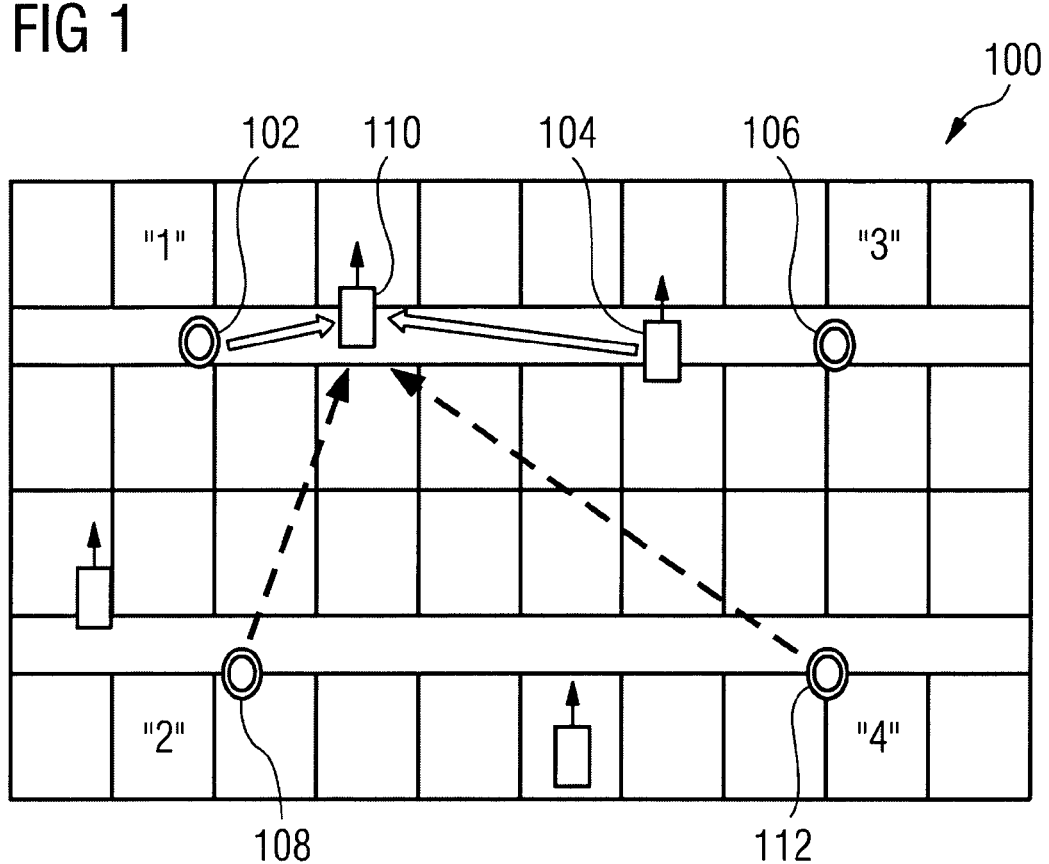
FIG. 1 illustrates an example local area wireless network in accordance with an example embodiment of the invention.

FIG. 1 illustrates an example local area network 100. The example local area network 100 includes four base stations, labeled as 102, 106, 108 and 112 respectively. The local area network 100 also has a number of user equipments (UEs), including UE 110 and a neighbor UE 104. The local area network 100 may be deployed in an environment such as a large office building, a school campus, a shopping center, an apartment complex, and the like.

In one example embodiment, the UE 110 is associated with the home base station 102 and the UE 104 is associated with its home base station 106. While the UE 110 is in a downlink mode, receiving data from the home base station 102, the neighbor UE 104 is in an uplink mode and transmitting data. Moreover, other two base stations 108 and 112 are in the downlink mode and transmitting data. As such, the UE 110, while receiving data from its home base station 102, may receive interference signals from the neighbor UE 104, and the two other base stations 108 and 112.

In one embodiment, the UE 110, the neighbor UE 104 and the home and neighbor base stations 102, 108 and 112 have been configured in such a way that designated channels for pilot signals are synchronized in both frequency domain and time domain and the signals on the synchronized resources are made orthogonal to each other. In the synchronized resource mode, the UE 110 sends a pilot signal to the base station 102 or its peer UE 104 on a fixed pilot channel, and may receive different pilot signals on the same channel from the neighbor UE 104 and the base stations 108 and 112 with minimal interferences.

In another example embodiment, the UE 110 is a LTE-A compliant mobile station and is receiving a transmission of pilot signal from the LTE-A compliant base station 102. At the same time, the LTE-A compliant UE 104 is transmitting a pilot signal to its associated LTE-A compliant base station 106. The transmission from the UE 104 may interfere with the reception of the UE 110 in normal case. In this case, the interference is minimized because the channel allocated to the UE 110 for reception of the pilot signal and the channel allocated for the UE 104 to transmit the pilot signal are synchronized in time and frequency domains and the signals are orthogonal to each other. In a similar manner, the same pilot channel is synchronized with the pilot channel for the base station 108 and the base station 112, and the interferences from those base stations are minimized as well.

Figure 2:
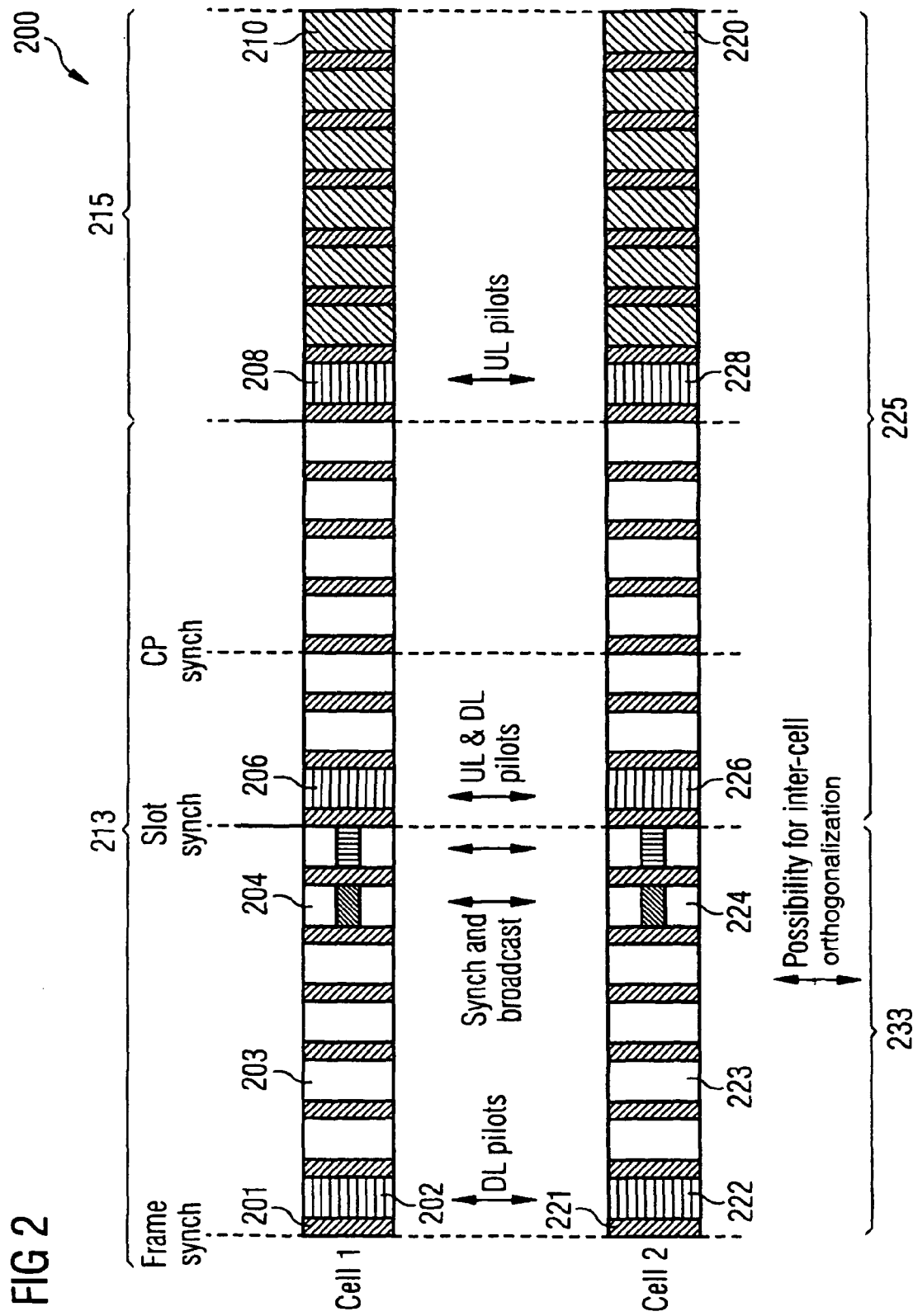
FIG. 2 illustrates an example resource synchronization scheme in accordance with an example embodiment of the invention.

FIG. 2 illustrates an exemplary resource synchronization scheme 200. In an exemplary embodiment, there are two resources 210 and 220 for two wireless network cells, cell 1 and cell 2 respectively. The resource 210 is for the cell 1 where the horizontal axis may represent a time dimension of the resource. Horizontal direction may also represent the frequency dimension. Similarly, the resource 220 represents the resource for the cell 2. The resource 210 for the cell 1 is further divided into downlink resource 213 and uplink resource 215. The resource 220 for the cell 2 is divided into the downlink resource 233 and the uplink resource 225. In this exemplary embodiment, the downlink and uplink pilots are transmitted in the channel immediately following the "frame synch" and "slot synch" marks. These marks indicate that frame or slot and cyclic prefix (CP) timing of two cells is aligned, i.e., two cells are synchronized with accuracy of frame/slot and cyclic prefix. The channels 202, 222, 206, 226, 208 and 228 with horizontal stripes represent control channels.

In an example embodiment, within the downlink resource 213 for the cell 1, the channel 202 after a cyclic prefix 201, represents a designated control channel or a control symbol. The cyclic prefix 201 is repeated for each data symbol (e.g., OFDMA block). The downlink control channel 202 for the cell 1 is synchronized with the downlink control channel 222 of the cell 2 in the time domain, the frequency domain or both. The resource 203 of the cell 1 to the right of a cyclic prefix represents one or more OFDM channels that are synchronized with downlink OFDM resource 223 of the cell 2. Similarly, the downlink pilot channel 204 of the cell 1 is synchronized with the downlink pilot channel 224.

In different embodiments, different combinations of resource synchronization may be configured. Downlink channel of one network device may be synchronized with downlink channel or uplink channel of another network device. Similarly, uplink channel of the network device may be synchronized with an uplink channel or a downlink channel of the other network device. In the exemplary embodiment 200, the downlink control channel 206 of the cell 1 is synchronized with the uplink control channel 226 of the cell 2. The uplink control channel 208 of the cell 1 is synchronized with the uplink control channel 228 of the cell 2. The resource synchronization scheme 200 may be implemented in a network device such as the UE 110 or the LTE-A base station 102 of FIG. 1.

Figure 3:
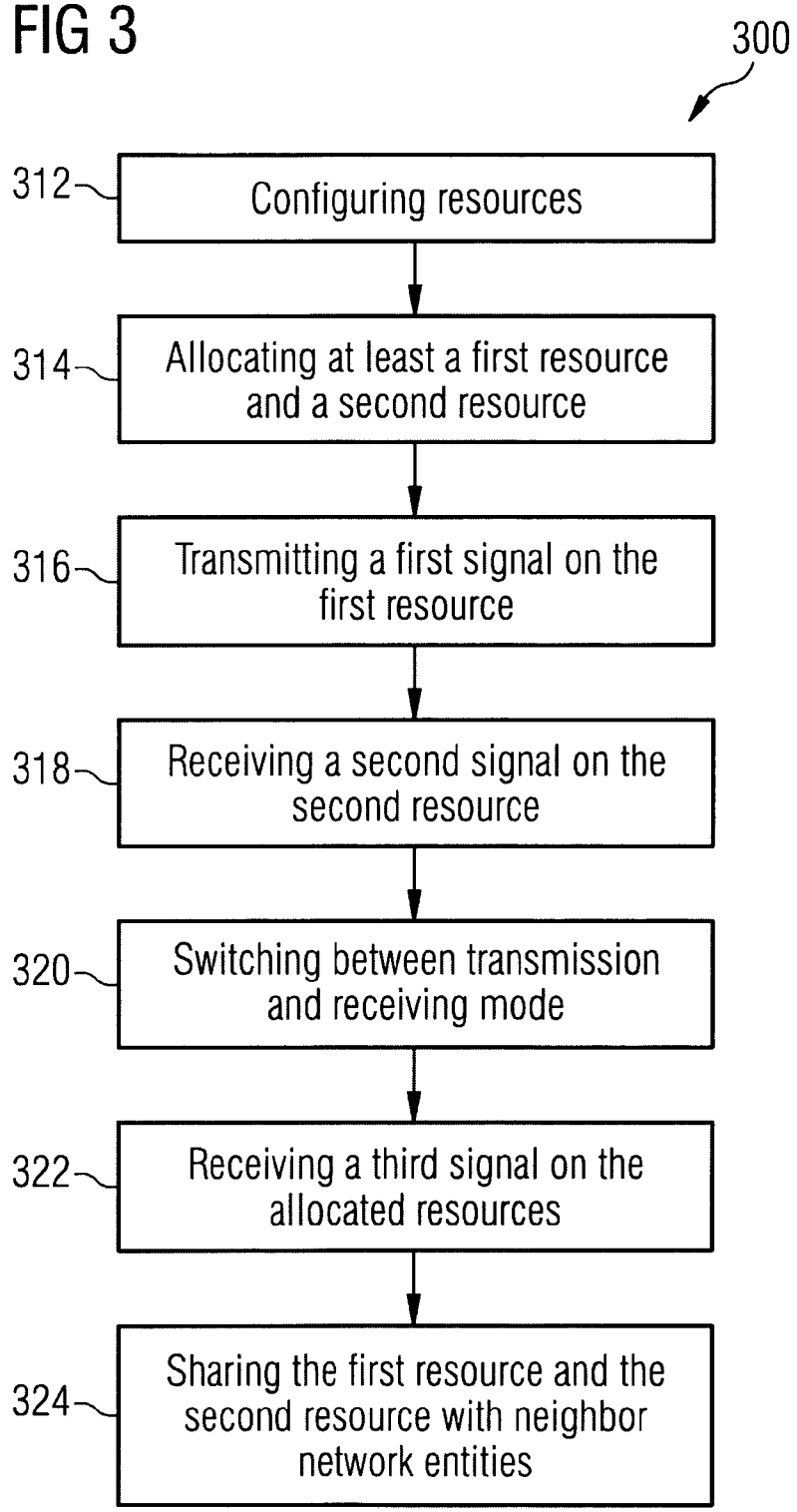
FIG. 3 illustrates an example method for resource synchronization and allocation in accordance with an example embodiment of the invention.

FIG. 3 illustrates an example method 300 for resource synchronization. The method 300 includes configuring resources at 312, and allocating at least a first resource and a second resource at 314. The method 300 may also include transmitting a first signal on the first resource at 316, and receiving a second signal on the second resource at 318. In addition, the method 300 may include switching between transmission and receiving modes at 320, receiving a third signal on the allocated resource at 322 and sharing the first resource and the second resource with neighbor network devices at 324.

In an example embodiment, configuring the resources at 312 in an embodiment may include configuring both downlink resource and uplink resources for a network device such as the UE 110 or the base station 102 of FIG. 1. Configuring the resources at 312 may include allocating channel frequency resources or time slots or both of the network devices in such a way that the orthogonality of a channel with respect to the same channel of neighbor devices may be achieved. Configuring the resource at 312 may also include mapping a specific type of channel, such as pilot channels to a fixed position in the resource so that neighbor network devices may designate the same channel for pilot signals in a similar way. In general, pilot signals can be limited to a predetermined portion of the total bandwidth or alternatively to a bandwidth allocated to user data and control signals. For example, the pilot signals may be any orthogonal or low cross-correlation sequence reserved for user data. Configuring resource at 312 may also include creating a same radio frame structure, reference signal structure, and control channel structure for neighbor network devices to facilitate the interference resistant communication. The orthogonality of the signals transmitted or received on the synchronized channel may be achieved via one of a number of established methods. Example methods may include a code division multiple access method, a channel coding method, a frequency division multiple access method, a modulation format, a multiple input multiple output transmission method, a spatial division multiple access coding method, and the like.

Configuring the resource at 312 in another embodiment may also include configuring the synchronized resources in such a way that a pilot channel and a control channel have the same radio frame and channel structure. Configuring resource at 312 may further include configuring the physical resources into divisible orthogonal allocation units to provide orthogonal sub-channels for pilot, control and data signals. Configuring resource at 312 may take place at a system design time or be performed dynamically.

In an example embodiment, allocating at least a first resource and a second resource at 314 in an embodiment may include allocating synchronized resources so that transmitting the first signal on the first resource and receiving the second signal on the second resource may take place on the same channel. For example, in an embodiment, a channel is allocated in a fixed position for receiving pilot signal from a base station or a neighbor peer mobile station. The same channel is allocated for transmitting a different pilot signal to the same base station or the peer UE.

In an example embodiment, transmitting the first signal on the first resource at 316 in an embodiment may include transmitting a pilot signal, a control signal, or a data signal on the allocated resource that is synchronized with a resource of the neighbor devices. Receiving the second signal on the second resource at 318 may include receiving a pilot signal, a control signal or a data signal on the second resource of the same network device. In an embodiment, the first resource and the second resource are synchronized in both the frequency domain and the time domain, meaning that the first resource and second resource share the same or at least partially overlapping frequency band and time slot. Not only the first signal and the second signal are orthogonal to each other, they are also orthogonal to a third, interfering signal that is not intended for the network device. The third signal may utilize the transmission format of the first signal or the second signal.

In an example embodiment, switching between a transmission mode and a receiving mode at 320 in an embodiment may include switching from the transmission mode to the receiving mode within one hardware or chip unit with little overhead. This is because the same signal structure is used for both uplink and downlink transmission and uplink and downlink reception in a single chip unit. In an example embodiment, switching between the transmission and receiving modes at 320 may include using the same structure in firmware for TDD switching points for both pilot signal transmission and pilot signal reception.

In an example embodiment, receiving a third signal on the allocated resource at 322 in an embodiment may include receiving an interfering pilot, control or data signal on the first or second resources from a neighbor network device. Receiving the third signal on the allocate resource at 322 may include automatically canceling out or minimizing the interferences from the third signal to the first signal that may be transmitted on the first resource on the same channel at the same time when the first signal is transmitted. Receiving the third signal on the allocate resource at 322 may also include automatically canceling out or minimizing the interferences from the third signal to the second signal that may be received on the second signal on the same channel at the same time when the second signal is received.

In an example embodiment, sharing the first resource and the second resource with neighbor network devices at 324 in an embodiment may include sending a signaling message to the neighbor network devices to synchronize the resource allocations among the neighbor devices in a local area network. Sharing the first resource and second resource may also include using an existing or a new signaling message to exchange resource allocation information. In one embodiment, the LTE-A radio resource control (RRC) signaling is used to share the resources allocation information among the neighbor network device. Sharing the first resource and the second resource at 324 may include sending a traffic map of this network device to one or more neighbor network devices and receiving a traffic map from each of the associated neighbor network device. The neighbor network devices may include a mobile station, a base station, an access point and the like.

Figure 4:
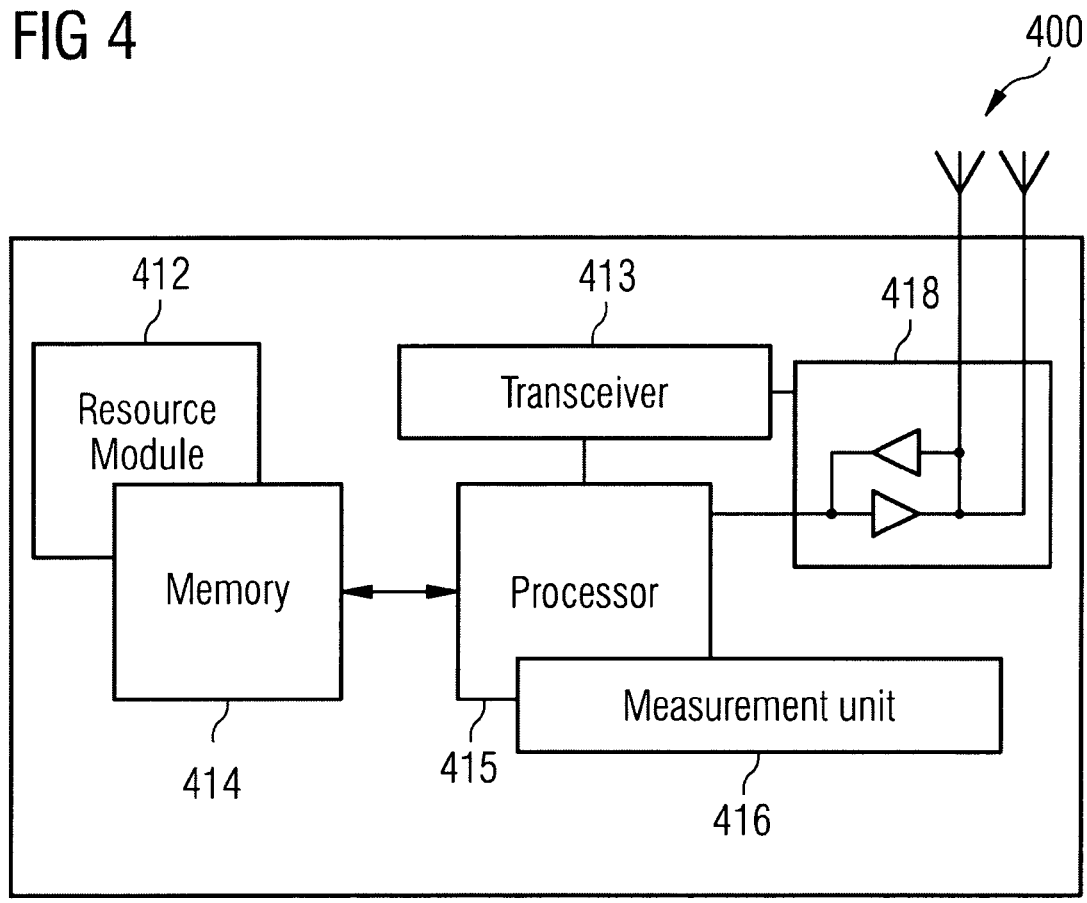
FIG. 4 illustrates an example wireless device for support of resource synchronization and allocation for interference-interference resistant wireless communications in accordance with an example embodiment of the invention.

In an example embodiment, the method 300 may be implemented in the UE 110 or the base station 102 of FIG. 1 or in the wireless device 400 of FIG. 4. The method 300 is for illustration only and the steps of the method 300 may be combined, divided, or executed in a different order than illustrated, without departing from the scope of the invention of this example embodiment.

FIG. 4 is a block diagram illustrating an example wireless device 400 for support of resource synchronization for interference-interference resistant wireless communications. In FIG. 4, the wireless device 400 may include a processor 415, a memory 414 coupled to the processor 415, and a suitable transceiver 413 (having a transmitter (TX) and a receiver (RX)) coupled to the processor 415, coupled to an antenna unit 418. The memory 414 may store programs such as a resource control module 412. The wireless device 400 may be at least part of a $4^{th}$ generation mobile station, a LTE-A compliant mobile station and a LTE-A compliant base station.

The processor 415 or some other form of generic central processing unit (CPU) or special-purpose processor such as digital signal processor (DSP), may operate to control the various components of the wireless device 400 in accordance with embedded software or firmware stored in memory 414 or stored in memory contained within the processor 415 itself. In addition to the embedded software or firmware, the processor 415 may execute other applications or application modules stored in the memory 414 or made available via wireless network communications. The application software may comprise a compiled set of machine-readable instructions that configures the processor 415 to provide the desired functionality, or the application software may be high-level software instructions to be processed by an interpreter or compiler to indirectly configure the processor 415.

In an example embodiment, the resource module 412 may be configured to allocate a first resource and a second resource that are at least partially synchronized on at least one of a time domain and frequency domain in such a way that they share a same frequency, a same time slot or both. The resource module 412 is further configured to synchronize the first signal and the second signal in time domain based on one of network assisted synchronization, global positioning system-based synchronization, over-the-air synchronization, and a UE assisted synchronization. The resource module 412 is also configured to share at least one of the first resource and the second resource with at least one of a neighbor base station and a neighbor UE.

The transceiver 413 is for bidirectional wireless communications with another wireless device. The transceiver 413 may provide frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to some analog baseband processing unit and/or the processor 415 or other central processing unit. In some embodiments, the transceiver 413, portions of the antenna unit 418, and an analog baseband processing unit may be combined in one or more processing units and/or application specific integrated circuits (ASICs).

In an example embodiment, the transceiver 413 is configured to transmit the first signal on the first resource and to receive the second signal on the second resource. The first signal and the second signal are at least partially orthogonalized with respect to a third signal that is transmitted on the second resource or on the first resource from a neighbor network entity. The first signal and the second signal may be pilot signals, control signals or data signals. The first signal and the second signal may share a same radio frame structure. If the first signal and the second signal are pilot or channel signals, they may have a same pilot channel structure or control channel structure. The first signal and the second signal are at least partially orthogonalized using one of the available coding methods. The example coding methods may include a code division multiple access coding method, a channel coding method, a frequency division multiplex coding method, a modulation format, a multiple input multiple output transmission method, a frequency division multiple access coding method, a spatial division multiple access coding method and the like.

The transceiver 413 is configured to operate in at least one of a time division duplex mode, a device to device mode, and an access point to access point mode. In addition, the transceiver 413 is configured to switch between a transmission mode and a reception mode within a single chip unit. This is due to the TDD mode of operation. At least one of the first resource and the second resource is shared with at least one of a nearby base station and a nearby mobile station. The first resource and the second resource may be symbols, sub-carriers or data blocks.

The antenna unit 418 may be provided to convert between wireless signals and electrical signals, enabling the wireless device 400 to send and receive information from a cellular network or some other available wireless communications network or from a peer wireless device. In an embodiment, the antenna unit 418 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 418 may include antenna tuning and/or impedance matching components, RF power amplifiers, and/or low noise amplifiers.

As shown in FIG. 4, the wireless device 400 may further include a measurement unit 416, which measures the signal strength level that is received from another wireless device, and compare the measurements with a configured threshold. The measurement unit may be utilized by the wireless device 400 in conjunction with various exemplary embodiments of the invention, as described herein.

In general, the various exemplary embodiments of the wireless device 400 may include, but are not limited to, part of a base station, mobile station, or a wireless device having wireless communication capabilities, portable computers having wireless communication capabilities, Internet appliances permitting wireless Internet access and browsing, as well as portable units or terminals that incorporate combinations of such functions. In one embodiment, the wireless device 400 may be implemented in either the UE 110 or base station 102 of FIG. 1.

Without in any way limiting the scope, interpretation, or application of the claims appearing below, a technical effect of one or more of the example embodiments disclosed herein is to minimizing interferences from neighbor network devices in a local area network. This may be achieved by synchronizing resources of the network device with that of the neighbor network devices in time domain and frequency domain and by orthogonalizing the signals carried on the synchronized resources. Another technical effect of one or more of the example embodiments disclosed herein to facilitate coordinated deployment of a wireless network such as a local area wireless network due to efficient sharing of the resource. Another technical effect of one or more of the example embodiments disclosed herein is efficient switching between transmission and reception within a single chip unit because transmitted and received signals have similar format. This is advantageous in the device-to-device mode and access point to access point mode. It allows also reuse of the same chip (with transmitter and receiver functionality) in both user equipment and access point.

Embodiments of the present invention may be implemented in software, hardware, application logic or a combination of software, hardware and application logic. The software, application logic and/or hardware may reside on a mobile station, a base station or other wireless network device. If desired, part of the software, application logic and/or hardware may reside on a user equipment, part of the software, application logic and/or hardware may reside on a base station, and part of the software, application logic and/or hardware may reside on other wireless device. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
   at least one processor;
   memory storing a program of instructions;
   wherein the memory storing the program of instructions is configured to, with the at least one processor, configure the apparatus to at least:
   allocate a first resource and a second resource that are at least partially synchronized in one or more of a time domain and a frequency domain in such a way that the first resource and the second resource share one or more of an overlapping frequency band and a same time slot; and
   transmit a first signal on the first resource;
   receive a second signal on the second resource;
   receive a third signal from a neighbor network device of the apparatus on one of the first resource and the second resource without the third signal being dedicated to the apparatus;
   determine a fixed position in both the first and second resources for transmitting the first signal and for receiving the second signal, wherein the fixed position is determined such that the neighbor network device uses the same fixed position in its resources for transmitting the third signal; and orthogonalize the first signal and the second signal with respect to the third signal;
wherein the same signal structure is used for the first signal, the second signal, and the third signal.

2. The apparatus of claim 1 wherein the first signal, and the second signal, and the third signal are mutually orthogonal pilot signals, and wherein determining the fixed position comprises mapping pilot channels in the respective resources so that the signals are transmitted on co-located pilot channels.

3. The apparatus of claim 2 wherein the first signal, the second signal, and the third signal share a same radio frame structure.

4. The apparatus of claim 1 further comprising a transceiver configured to perform transmission and receiving in at least one of a time division duplex mode, a device-to-device mode and an access point to access point mode.

5. The apparatus of claim 1 wherein the orthogonalization is based at least in part on one of a code division multiple access technique, a channel coding technique, a frequency division multiple access technique, a modulation technique, a multiple input multiple output transmission technique, and a spatial division multiple access technique.

6. The apparatus of claim 1 wherein at least one of the first resource and the second resource is shared with at least one of a neighbor base station and a neighbor user equipment.

7. The apparatus of claim 1 wherein the first signal is a pilot signal that is transmitted on the first resource and the second signal is a second pilot signal that is received on the second resource wherein the first resource and second resource are synchronized in both the time domain and the frequency domain and have at least one fixed channel allocation.

8. The apparatus of claim 1 wherein the apparatus comprises a transceiver configured implemented in a single chip unit and configured to switch between one of a uplink transmission mode and a downlink transmission mode and one of an uplink reception mode and a downlink reception mode.

9. The apparatus of claim 1 wherein the first resource and the second resource are symbols, sub-carriers or data blocks.

10. The apparatus of claim 1 wherein apparatus is further caused to synchronize the first signal and the second signal in time domain with respect to a third signal based at least in part on one of a network assisted synchronization, a global positioning system-based synchronization, an over-the-air synchronization, and a UE assisted synchronization.

11. The apparatus of claim 1 wherein the apparatus is at least part of a long term evolution-advanced (LTE-A) compliant user equipment, an LTE-A access point, and an LTE-A base station.

12. A method, comprising:
allocating a first resource and a second resource that are at least partially synchronized in one or more of a time domain and a frequency domain in such a way that the first resource and the second resource share one or more of an overlapping frequency band and a same time slot;
transmitting a first signal on the first resource;
receiving a second signal on the second resource;
receiving a third signal from a neighbor network device of the apparatus on one of the first resource and the second resource without the third signal being dedicated to the apparatus;
determining a fixed position in both the first and second resources for transmitting the first signal and for receiving the second signal, wherein the fixed position is determined such that the neighbor network device uses the same fixed position in its resources for transmitting the third signal; and
orthogonalizing the first signal and the second signal with respect to the third signal;
wherein the same signal structure is used for the first signal, the second signal, and the third signal.

13. The method of claim 12, further comprising sharing at least one of the first resource and the second resource with at least one of a neighbor network device.

14. The method of claim 12, further comprising switching between a transmission mode and a reception mode within a single chip unit.

15. The method of claim 12, further comprising configuring channel frequencies or time slots of the first resource and the second resource in such a way that the orthogonality of the first signal and second signal with respect to the third signal of a neighbor network device is achieved.

16. The method of claim 15 wherein configuring the first resource and the second resource comprises dividing the first resource and the second resources into divisible orthogonal allocation units to provide orthogonal sub-channels for pilot, control and data signals.

17. The method of claim 16 wherein configuring the first resource and the second resource comprises designing the first resource and the second resource in such a way that they share a same radio frame structure.

18. The method of claim 12 wherein the first signal, the second signal, and the third signal are mutually orthogonal pilot signals, and wherein determining the fixed position comprises mapping pilot channels in the respective resources so that the signals are transmitted on co-located pilot channels.

19. A non-transitory computer readable medium storing a program of instructions, execution of which by a processor configures an apparatus to at least:
allocate a first resource and a second resource that are at least partially synchronized in one or more of a time domain and a frequency domain in such a way that the first resource and the second resource share one or more of an overlapping frequency band and a same time slot;
transmit a first signal on the first resource;
receive a second signal on the second resource;
receive a third signal from a neighbor network device of the apparatus on one of the first resource and the second resource without the third signal being dedicated to the apparatus;
determine a fixed position in both the first and second resources for transmitting the first signal and for receiving the second signal, wherein the fixed position is determined such that the neighbor network device uses the same fixed position in its resources for transmitting the third signal; and
orthogonalize the first signal and the second signal with respect to the third signal,
wherein the same signal structure is used for the first signal, the second signal, and the third signal.

20. The non-transitory computer readable medium of claim 19, wherein the apparatus is further configured to:
operate in at least one of a time division duplex mode, a device-to-device mode and an access point to access point mode.

* * * * *